(12) United States Patent
Varma et al.

(10) Patent No.: US 12,247,756 B2
(45) Date of Patent: Mar. 11, 2025

(54) METHOD AND DEVICE FOR CONTROLLING AIR CONDITIONER TEMPERATURE, AND AIR CONDITIONER

(71) Applicant: Airtek International Corporation Limited, Kowloon (CN)

(72) Inventors: Sanjay Varma, Zhongshan (CN); Anand Vyas, Zhongshan (CN); Yi Pu, Zhongshan (CN); Heping Peng, Zhongshan (CN)

(73) Assignee: Airtek International Corporation Limited, Hong Kong (CN)

( * ) Notice: Subject to any disclaimer, the term of this patent is extended or adjusted under 35 U.S.C. 154(b) by 421 days.

(21) Appl. No.: 17/756,685

(22) PCT Filed: Jun. 28, 2020

(86) PCT No.: PCT/CN2020/098577
§ 371 (c)(1),
(2) Date: May 31, 2022

(87) PCT Pub. No.: WO2021/169109
PCT Pub. Date: Sep. 2, 2021

(65) Prior Publication Data
US 2022/0412595 A1    Dec. 29, 2022

(30) Foreign Application Priority Data
Feb. 26, 2020  (CN) .......................... 202010122132.7

(51) Int. Cl.
*F24F 11/67*    (2018.01)
*F24F 11/64*    (2018.01)
*F24F 110/10*   (2018.01)

(52) U.S. Cl.
CPC ............... *F24F 11/64* (2018.01); *F24F 11/67* (2018.01); *F24F 2110/10* (2018.01)

(58) Field of Classification Search
CPC ......... F24F 11/64; F24F 11/67; F24F 2110/10
See application file for complete search history.

(56) References Cited

U.S. PATENT DOCUMENTS

| | | | |
|---|---|---|---|
| 2015/0310461 A1* | 10/2015 | Lee ........................ | G06Q 10/04 705/412 |
| 2017/0292728 A1* | 10/2017 | Ushirosako ............ | F24F 11/523 |
| 2019/0264949 A1 | 8/2019 | Yin et al. | |

FOREIGN PATENT DOCUMENTS

| CN | 106642553 A | 5/2017 |
|---|---|---|
| CN | 106817909 A | 6/2017 |

(Continued)

OTHER PUBLICATIONS

International Search Report of PCT/CN2020/098577.

*Primary Examiner* — Gary Collins
(74) *Attorney, Agent, or Firm* — Wang Law Firm, Inc.

(57) ABSTRACT

The disclosure provides a method for controlling air conditioner temperature. The method comprises the following steps: acquiring the operating mode of an air conditioner at the current moment, wherein the operating mode comprises refrigerating mode and heating mode; acquiring the historical duration of operation of the air conditioner in the operating mode; judging whether the historical duration is greater than the first set duration or not; and if so, setting the current operating temperature of the air conditioner based on the set operating temperature and the optimal reference temperature of the air conditioner at the first specified historical moment. The method has the advantages that the current operating temperature can be set according to the historical operating temperature of the air conditioner, and body feeling delay caused by the fact that a user has to manually set the temperature is avoided.

10 Claims, 2 Drawing Sheets

Acquiring the operating mode of an air conditioner at the current moment, wherein the operating mode comprises refrigerating mode and heating mode; — 101

Acquiring the historical duration of operation of the air conditioner in the operating mode; — 102

Judging whether the historical duration is greater than the first set duration or not; and if so, setting the current operating temperature of the air conditioner based on the set operating temperature and the optimal reference temperature of the air conditioner at the first specified historical moment. — 103

(56) References Cited

FOREIGN PATENT DOCUMENTS

| | | |
|---|---|---|
| CN | 110440413 A | 11/2019 |
| CN | 110608522 A | 12/2019 |
| CN | 111306733 A | 6/2020 |
| JP | 2017-219298 U | 12/2017 |

* cited by examiner

METHOD AND DEVICE FOR CONTROLLING AIR CONDITIONER TEMPERATURE, AND AIR CONDITIONER

TECHNICAL FIELD

The disclosure belongs to the technical field of air conditioners, in particular to a method and a device for controlling air conditioner temperature, and an air conditioner.

BACKGROUND

In the prior art, the setting of air conditioner temperature is generally based on manual adjustment of a user, but generally, the user manually adjusts the air conditioner temperature only when the user feels overcooled or overheated. Therefore, the way that the user manually adjusts the set temperature is not only tedious, but also cannot ensure that the indoor temperature is kept in a human comfort range, so that body feeling delay is caused, and the user experience is reduced.

Therefore, in view of the above technical problem, it is necessary to provide a method for controlling air conditioner temperature to solve the problem that the operating temperature of an air conditioner must be manually adjusted by a user.

SUMMARY

The disclosure aims at providing a method for controlling air conditioner temperature to solve the problem that the operating temperature of an air conditioner must be manually adjusted by a user in the prior art.

In order to achieve the purpose, the technical scheme provided by an embodiment of the disclosure is as follows:

in one embodiment, the disclosure provides a method for controlling the air conditioner temperature, and the method comprises the following steps:

acquiring the operating mode of an air conditioner at the current moment, wherein the operating mode comprises refrigerating mode and heating mode;

acquiring the historical duration of operation of the air conditioner in the operating mode;

judging whether the historical duration is greater than the first set duration or not; and if so, setting the current operating temperature of the air conditioner based on the set operating temperature and the optimal reference temperature of the air conditioner at the first specified historical moment; wherein, the optimal reference temperature is associated with each set operating temperature of the air conditioner, the duration of operation at each set operating temperature and the power consumption in the first set duration before the current moment.

Optionally, the step of acquiring the historical duration of operation of the air conditioner in the operating mode specifically comprises the following substeps:

acquiring the closest historical moment different from the operating mode of the air conditioner at the current moment; and taking the duration between the closest historical moment and the current moment as the historical duration of operation of the air conditioner in the operating mode.

Optionally, the step of setting the current operating temperature of the air conditioner based on the set operating temperature and the optimal reference temperature of the air conditioner at the first specified historical moment specifically comprises the following substeps:

respectively calculating the sum value after the corresponding operating duration and the power consumption of the air conditioner are respectively weighted at each set operating temperature; and taking the set operating temperature corresponding to the calculated maximum sum value as the optimal reference temperature.

Optionally, the step of setting the current operating temperature of the air conditioner based on the set operating temperature and the optimal reference temperature of the air conditioner at the first specified historical moment specifically comprises the following substep:

setting the average value of the set operating temperature and the optimal reference temperature of the air conditioner at the first specified historical moment as the current operating temperature of the air conditioner.

Optionally, the method also comprises the following steps:

judging whether the operating mode of the air conditioner at the first specified historical moment is the same as that at the current moment; if not, taking the optimal reference temperature as set operating temperature at the first specified historical moment; and/or the first specified historical moment represents a moment that is 24 hours before the current moment.

Optionally, the method also comprises the following steps:

if the historical duration is not greater than the first set duration, judging whether the historical duration is less than second set duration or not; and if so, setting the current operating temperature of the air conditioner based on the set temperature of the air conditioner at the current moment.

Optionally, when the air conditioner operates for the second set duration from the current moment, and/or when the historical duration is greater than or equal to the second set duration, the current operating temperature of the air conditioner is set based on the set operating temperature of the air conditioner at the second specified historical moment and the current indoor and outdoor temperature difference.

Optionally, the current operating temperature of the air conditioner set based on the set operating temperature of the air conditioner at the second specified historical moment and the current indoor and outdoor temperature difference is as follows:

$$Ts = Tpre + K*(Tout - Troom)$$

wherein, Ts represents the current operating temperature of the air conditioner, Tpre represents the operating temperature of the air conditioner at the second specified moment, K represents a correction coefficient, Tout represents the current outdoor temperature, and Troom represents the current indoor temperature; and/or the second specified historical moment represents a moment that is 1 hour before the current moment.

in one embodiment, the disclosure also provides a method for controlling the air conditioner temperature, comprising:

an acquisition module, used for acquiring the operating mode of an air conditioner at the current moment, wherein the operating mode comprises refrigerating mode and heating mode, and used for acquiring the historical duration of operation of the air conditioner in the operating mode;

a judgment module, used for judging whether the historical duration is greater than the first set duration or not; and a setting module, used for setting the current operating temperature of the air conditioner based on the set operating temperature and the optimal reference temperature of the air conditioner at the first specified historical moment when the historical duration is greater than the first set duration; wherein, the optimal reference temperature is associated with each set operating temperature of the air conditioner, the duration of operation at each set operating temperature and the power consumption in the first set duration before the current moment.

In one embodiment, the disclosure also provides an air conditioner, and the temperature is controlled by using the method according to any one of the above claims.

Compared with the prior art, the operating mode of the air conditioner at the current moment and the historical duration of operation of the air conditioner in the operating mode are acquired, and whether the historical duration is greater than the first preset duration or not is judged; and if so, the current operating temperature of the air conditioner is set based on the set operating temperature and the optimal reference temperature of the air conditioner at the first specified historical moment. Therefore, the current operating temperature can be set according to the historical operating temperature of the air conditioner, and body feeling delay caused by the fact that the user has to manually set the temperature is avoided.

BRIEF DESCRIPTION OF THE DRAWINGS

In order to illustrate the technical scheme in the embodiment of the disclosure or in the prior art more clearly, the accompanying diagrams needing to be used in the embodiment or in the description in the prior art are simply described. Apparently, the embodiments recorded in the following description are merely a part rather than all of the embodiments of the disclosure. For those of ordinary skill in the art, under the premise of without contributing creative labor, other accompanying diagrams further can be obtained according to these accompanying diagrams.

DESCRIPTION OF THE EMBODIMENTS

The disclosure is described in detail in conjunction with the following embodiments as shown in the accompanying diagrams. However, the disclosure is not restricted by the embodiment, and the conversion of structures, methods or functions made by those of ordinary skill in the art according to the embodiment contains in the scope of protection of the disclosure.

Figure 1:
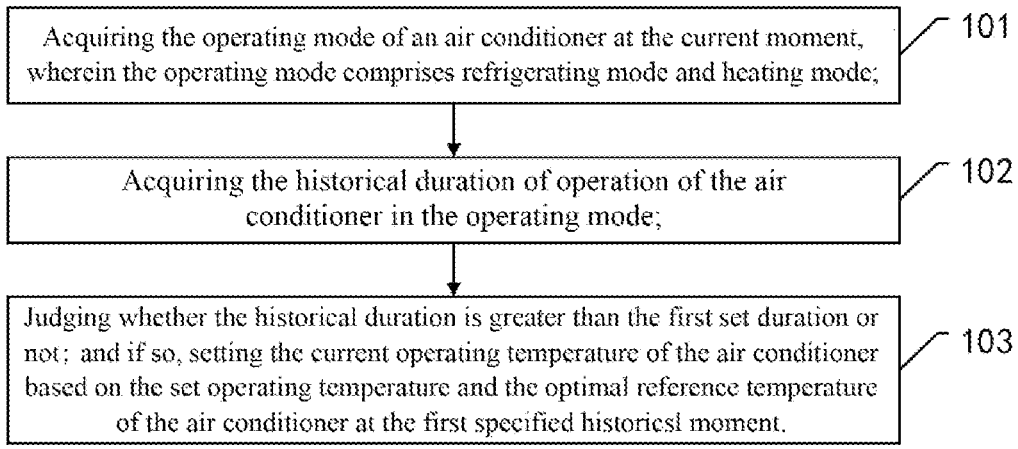
FIG. 1 is a schematic diagram of steps of a method for controlling air conditioner temperature provided in one embodiment of the disclosure.
Figure 2:
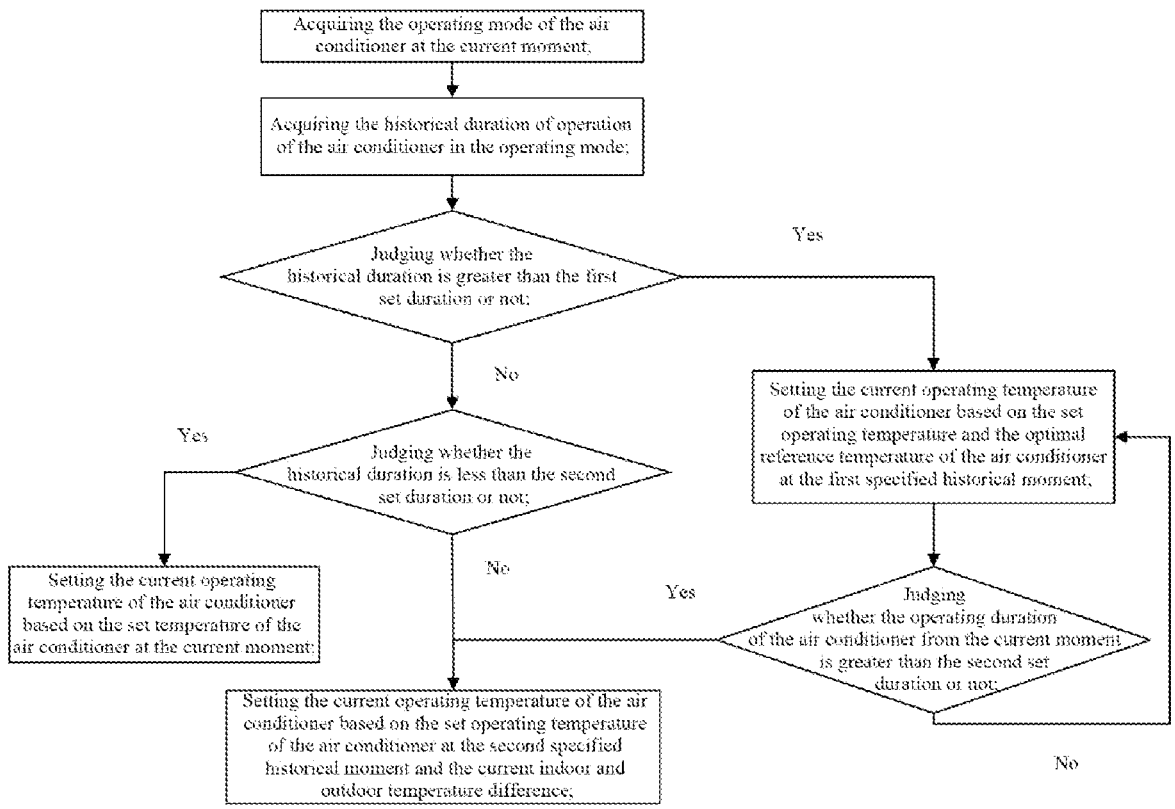
FIG. 2 is a flow diagram of a method for controlling air conditioner temperature provided in one embodiment of the disclosure.

As shown in FIG. 1 and FIG. 2, a method for controlling air conditioner temperature of the disclosure specifically comprises the following steps:

S101, acquiring the operating mode of an air conditioner at the current moment, wherein the operating mode comprises refrigerating mode and heating mode;

known from step S101, before the current operating temperature of the air conditioner is set, firstly the current operating mode of the air conditioner needs to be acquired, and the operating mode can be refrigerating mode or heating mode.

S102, acquiring the historical duration of operation of the air conditioner in the operating mode.

Specifically, if the current operating mode of the air conditioner is the heating mode, the historical duration of operation of the air conditioner in the heating mode is acquired, in the historical duration, the operating mode of the air conditioner can be heating mode, dehumidification mode, ventilation mode, shutdown mode or other modes, but does not contain refrigerating mode; and similarly, if the current operating mode of the air conditioner is the refrigerating mode, the historical duration of operation of the air conditioner in the refrigerating mode is acquired, and in the historical duration, the operating mode of the air conditioner can include other operating modes except the refrigerating mode but does not contain the heating mode.

In specific application, the historical duration of operation of the air conditioner in the operating mode is acquired, specifically the way comprising the following steps can be adopted: acquiring the closest historical moment different from the operating mode of the air conditioner at the current moment; and taking the duration between the closest historical moment and the current moment as the historical duration of operation of the air conditioner in the operating mode.

For example, when the operating mode of the air conditioner at the current moment is the heating mode, the closest historical moment of the operating moment and the current moment in the refrigerating mode is acquired, and the duration between the historical moment and the current moment is taken as the historical duration of operation of the air conditioner in the heating mode. Correspondingly, when the operating mode of the air conditioner at the current moment is the refrigerating mode, the closest historical moment of the current moment in the refrigerating mode is acquired, and the duration between the historical moment and the current moment is taken as the historical duration of operation of the air conditioner in the refrigerating mode. In the embodiment of the disclosure, different operating modes indicate that the refrigerating mode is different from the heating mode, but the refrigerating or heating mode and other operating modes can be understood as the same operating mode, for example, the refrigerating mode and the ventilation mode can be understood as the same operating mode.

S103, judging whether the historical duration is greater than the first set duration or not; and if so, the current operating temperature of the air conditioner is set based on the set operating temperature and the optimal reference temperature of the air conditioner at the first specified historical moment.

Here, the optimal reference temperature is associated with each set operating temperature of the air conditioner, the duration of operation at each set operating temperature and the power consumption in the first set duration before the current time.

It should be understood that the calculation of the historical duration must be based on the same operating mode, if the current operating mode is the refrigerating mode, the operating duration of the air conditioner in the refrigerating mode is taken as the historical duration; and similarly, if the current operating mode is the heating mode, the operating duration of the air conditioner in the heating mode is taken as the historical duration.

In one scheme, if the historical duration of operation of the air conditioner in the refrigerating or heating mode is greater than the first set duration, the current operating temperature of the air conditioner is set based on the set operating temperature and the optimal reference temperature of the air conditioner at the first specified historical time.

The first specified historical moment is a certain determined moment in the historical duration, and the first specified historical moment is selected based on the fact that the temperature corresponding to the first specified historical moment can be close to the current moment with greater probability, so that the reference of the temperature at the first specified historical moment to the temperature setting of the current moment is guaranteed. For example, since the temperature change at the same time within every two adjacent days is generally relatively stable, the first specified historical time may be set to a moment 24 hours before the current moment.

The optimal reference temperature can be understood as the most reasonable value of the operating temperature of the air conditioner among various values of the operating temperature of the air conditioner in the historical duration. In the disclosure, the optimal reference temperature can be specifically calculated in the following manner: respectively calculating the sum value after the corresponding operating duration and the power consumption of the air conditioner are respectively weighted at each set operating temperature; and taking the set operating temperature corresponding to the calculated maximum sum value as the optimal reference temperature.

For example, when the historical duration of operation of the air conditioner is 72 hours, the weight corresponding to the accumulated time of operation of the air conditioner is 0.6, and the weight corresponding to power consumption is 0.4. When the duration of operation of the air conditioner at 23 DEG C is 6 hours, and the power consumption is 3 degrees, a formula is substituted to calculate: 6*0.6+ 3*0.4=4.8; when the duration of operation of the air conditioner at 24 DEG C is 5 hours, and the power consumption is 2.5 degrees, a formula is substituted to calculate: 5*0.6+ 2.5*0.4=4; when the duration of operation of the air conditioner at 25 DEG C is 8 hours, and the power consumption is 2.5 degrees, a formula is substituted to calculate: 8*0.6+ 2.5*0.4=5.8; when the duration of operation of the air conditioner at 26 DEG C is 16 hours, and the power consumption is 4 degrees, a formula is substituted to calculate: 16*0.6+4*0.4=11.2; wherein the maximum value is 11.2 and the corresponding temperature is 26 DEG C, and therefore, 26 DEG C is the optimal reference temperature for the 72 hours.

The current operating temperature of the air conditioner is set based on the set operating temperature and the optimal reference temperature of the air conditioner at the first specified historical moment, and specifically the average value of the set operating temperature and the optimal reference temperature of the air conditioner at the first specified historical moment is set as the current operating temperature of the air conditioner.

For example, the set operating temperature of the air conditioner at the first specified historical moment is 28 DEG C, the optimal reference temperature is 26 DEG C, and the current operating temperature of the air conditioner is (26+28)/2=27 DEG C.

If the operating mode of the air conditioner at the first specified historical moment is different from the current moment, the optimal reference temperature is taken as the set operating temperature at the first specified historical moment.

It should be understood that if the current operating mode of the air conditioner is refrigerating mode and the operating mode of the air conditioner at the first specified historical moment is heating mode, and since the operating modes of the air conditioner are different, the set temperature at which the air conditioner operates in the mode has no reference value to the current moment. Therefore, the optimal reference temperature is taken as set operating temperature at the first specified historical moment.

The embodiment illustrates the method for controlling air conditioner temperature when the historical duration is greater than the first set duration in the disclosure. If the historical duration is not greater than the first set duration, whether the historical duration is less than second set duration or not is judged; and if so, the current operating temperature of the air conditioner is set based on the set temperature of the air conditioner at the current moment.

It should be understood that the second set duration is less than the first set duration, under normal conditions, the second set duration is 1 hour, and the operating time of the air conditioner is short if the historical duration of operation of the air conditioner is less than the second set duration. For example, when the user buys and takes the air conditioner into home, there is no temperature available for reference until the current moment, and thus the air conditioner operates directly at the temperature set by the user.

Furthermore, when the air conditioner operates for the second set duration from the current moment, and/or when the historical duration is greater than or equal to the second set duration,
   the current operating temperature of the air conditioner is set based on the set operating temperature of the air conditioner at the second specified historical moment and the current indoor and outdoor temperature difference.

It should be understood that, on one hand, if the operating historical duration of the air conditioner based on the temperature set by the user is greater than or equal to the second set duration, the current operating temperature of the air conditioner is set based on the set operating temperature of the air conditioner at the second specified historical moment and the current indoor and outdoor temperature different. Here, the second specified historical moment is a certain determined moment in the historical duration, and since the air conditioner has operated for the second set duration, the set operating temperature at the second specified historical duration has greater reference with respect to the set operating temperature of the user.

On the other hand, if the air conditioner operates for the second set duration from the current moment, the current operating temperature of the air conditioner is set based on the set operating temperature of the air conditioner at the second specified historical moment and the current indoor and outdoor temperature difference. Here, the second specified historical moment is a certain determined moment between the current time and the moment after the second set duration from the current duration. Similarly, since the first set duration is longer than the second set duration, the variation of the temperature within the second set duration is relatively stable, and therefore, the set operating temperature at the second specified historical moment has greater reference with respect to the first specified historical moment.

Same as the first specified historical duration, the second specified historical moment is selected based on the fact that the temperature corresponding to the first specified historical moment can be close to the current moment with greater probability, so that the reference of the temperature at the first specified historical moment to the temperature setting of the current moment is guaranteed. For example, since the temperature change within one hour is generally relatively stable, the second specified historical moment may be set to a moment that is 24 hours before the current moment.

The reason why reference is made to the current indoor and outdoor temperature difference is that it is considered that if extreme weather is encountered, for example, the temperature increases or decreases suddenly for a short time, and at this time, the outdoor temperature at the current time has greater influence on the indoor temperature.

Furthermore, the current operating temperature of the air conditioner set based on the set operating temperature of the air conditioner at the second specified historical moment and the current indoor and outdoor temperature difference is as follows:

$$Ts = Tpre + K*(Tout - Troom)$$

wherein, Ts represents the current operating temperature of the air conditioner, Tpre represents the operating temperature of the air conditioner at the second specified moment, K represents a correction coefficient, Tout represents the current outdoor temperature, and Troom represents the current indoor temperature.

Specifically, the correction coefficient K can take different values according to different time periods, for example, the value of the correction coefficient at 22 O'clock to 8 O'clock every day is 0.6, and the value of the correction coefficient at 8 O'clock to 22 O'clock every day is 0.3. The current outdoor temperature value Tout can be obtained by inquiring the temperature at the current time and at the current place through a network, or the current outdoor temperature can be acquired in real time by setting a temperature sensor, and the specific ways are not described in detail herein.

The operating mode of the air conditioner at the current moment and the historical duration of operation of the air conditioner in the operating mode are acquired, and whether the historical duration is greater than the first preset duration or not is judged; and if so, the current operating temperature of the air conditioner is set based on the set operating temperature and the optimal reference temperature of the air conditioner at the first specified historical moment. Therefore, the current operating temperature can be set according to the historical operating temperature of the air conditioner, and body feeling delay caused by the fact that the user has to manually set the temperature is avoided.

Figure 3:
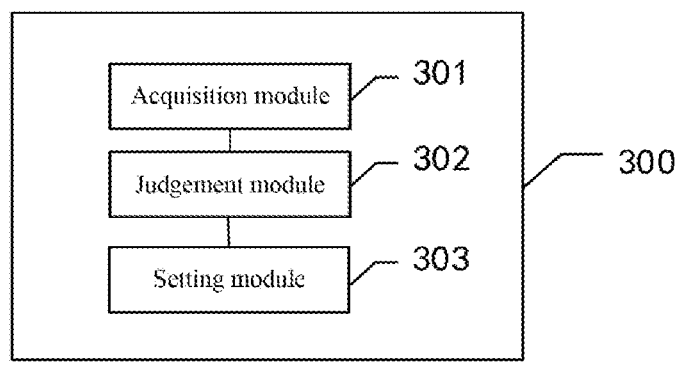
FIG. 3 is a structure diagram of a device for controlling air conditioner temperature provided in one embodiment of the disclosure.

As shown in FIG. 3, the disclosure also provides a device 300 for controlling air conditioner temperature, comprising:
 an acquisition module 301, used for acquiring the operating mode of the air conditioner at the current moment, wherein the operating mode comprises refrigerating mode and heating mode, and used for acquiring the historical duration of operation of the air conditioner in the operating mode;
 a judgment module 302, used for judging whether the historical duration is greater than the first set duration or not; and
 a setting module 303, used for setting the current operating temperature of the air conditioner based on the set operating temperature and the optimal reference temperature of the air conditioner at the first specified historical moment when the historical duration is greater than the first set duration; wherein, the optimal reference temperature is associated with each set operating temperature of the air conditioner, the duration of operation at each set operating temperature and the power consumption in the first set duration before the current moment.

It should be understood that the manner in which the operating temperature of the air conditioner is set by the device for controlling air conditioner temperature can specifically refer to the method and is not described in detail herein.

The operating mode of the air conditioner at the current moment and the historical duration of operation of the air conditioner in the operating mode are acquired, and whether the historical duration is greater than the first preset duration or not is judged; and if so, the current operating temperature of the air conditioner is set based on the set operating temperature and the optimal reference temperature of the air conditioner at the first specified historical moment. Therefore, the current operating temperature can be set according to the historical operating temperature of the air conditioner, and body feeling delay caused by the fact that the user has to manually set the temperature is avoided.

The disclosure also provides an air conditioner which uses the method in the embodiment to carry out temperature control, and therefore, the specific temperature control method can partially or fully refer to the embodiment; and moreover, since improvements on the features of other parts of the air conditioner are not involved herein, and unnecessary details are not given any more.

It should be understood that the manner in which the operating temperature of the air conditioner is set by the air conditioner can specifically refer to the method and is not described in detail herein.

The operating mode of the air conditioner at the current moment and the historical duration of operation of the air conditioner in the operating mode are acquired, and whether the historical duration is greater than the first preset duration or not is judged; and if so, the current operating temperature of the air conditioner is set based on the set operating temperature and the optimal reference temperature of the air conditioner at the first specified historical moment. Therefore, the current operating temperature can be set according to the historical operating temperature of the air conditioner, and body feeling delay caused by the fact that the user has to manually set the temperature is avoided.

For those skilled in the art, obviously the disclosure is not limited to the details of the exemplary embodiment, and the disclosure can be achieved in other specific forms without departing from the spirit or essential characteristics of the disclosure. Therefore, for every point, the embodiments should be regarded as exemplary embodiments and are unrestrictive, the scope of the disclosure is restricted by the claims appended hereto, and therefore, all changes, including the meanings and scopes of equivalent elements, of the claims are aimed to be included in the disclosure. The appended drawing reference signs in the claims shall not be regarded to limit the involved claims.

In addition, it should be understood that although the specification is described in terms of embodiments, not every embodiment contains only one independent technical scheme, such narrative form of the specification is for clarity only, those skilled in the art shall take the specification as a whole, and the technical schemes in each embodiment may also be combined as appropriate to form other embodiments that may be understood by those skilled in the art.

What is claimed is:

1. A method for controlling air conditioner temperature, comprising:
   acquiring an operating mode of an air conditioner at a current moment, wherein the operating mode comprises refrigerating mode and heating mode;
   acquiring a historical duration of operation of the air conditioner in the operating mode;
   judging whether the historical duration is greater than a first set duration or not; and if the historical duration is greater,
   setting the current operating temperature of the air conditioner based on a set operating temperature and an optimal reference temperature of the air conditioner at a first specified historical moment; wherein, the optimal reference temperature is associated with each set operating temperature of the air conditioner, duration of operation at each set operating temperature and power consumption in the first set duration before the current moment.

2. The method according to claim 1, characterized in that the step of acquiring the historical duration of operation of the air conditioner in the operating mode specifically comprises the following substeps:
   acquiring a closest historical moment different from the operating mode of the air conditioner at the current moment; and
   taking a duration between the closest historical moment and the current moment as the historical duration of operation of the air conditioner in the operating mode.

3. The method according to claim 1, characterized in that the step of setting the current operating temperature of the air conditioner based on the set operating temperature and the optimal reference temperature of the air conditioner at the first specified historical moment specifically comprises the following substeps:
   respectively calculating a sum value after the corresponding operating duration and the power consumption of the air conditioner are respectively weighted at each set operating temperature; and
   taking the set operating temperature corresponding to the calculated maximum sum value as the optimal reference temperature.

4. The method according to claim 1, characterized in that the step of setting the current operating temperature of the air conditioner based on the set operating temperature and the optimal reference temperature of the air conditioner at the first specified historical moment specifically comprises the following substep:
   setting an average value of the set operating temperature and the optimal reference temperature of the air conditioner at the first specified historical moment as the current operating temperature of the air conditioner.

5. The method according to claim 4, characterized in that the method also comprises the following steps:
   judging whether the operating mode of the air conditioner at the first specified historical moment is the same as that at the current moment; if not,
   taking the optimal reference temperature as set operating temperature at the first specified historical moment; and/or
   the first specified historical moment represents a moment that is 24 hours before the current moment.

6. The method according to claim 1, characterized in that the method also comprises the following steps:
   if the historical duration is not greater than the first set duration, judging whether the historical duration is less than a second set duration or not; and if so, setting the current operating temperature of the air conditioner based on the set temperature of the air conditioner at the current moment.

7. The method according to claim 1, characterized in that when the air conditioner operates for the second set duration from the current moment, and/or when the historical duration is greater than or equal to the second set duration,
   the current operating temperature of the air conditioner is set based on the set operating temperature of the air conditioner at the second specified historical moment and the current indoor and outdoor temperature difference.

8. The method according to claim 7, characterized in that the current operating temperature of the air conditioner set based on the set operating temperature of the air conditioner at the second specified historical moment and the current indoor and outdoor temperature difference is as follows:

$$Ts = Tpre + K*(Tout - Troom)$$

wherein, Ts represents the current operating temperature of the air conditioner, Tpre represents the operating temperature of the air conditioner at the second specified moment, K represents a correction coefficient, Tout represents the current outdoor temperature, and Troom represents the current indoor temperature; and/or
   the second specified historical moment represents a moment that is 1 hour before the current moment.

9. An air conditioner, characterized in that the temperature is controlled by the method according to claim 1.

10. A device for controlling air conditioner temperature, comprising:
   an acquisition module, used for acquiring an operating mode of an air conditioner at a current moment, wherein the operating mode comprises refrigerating mode and heating mode, and used for acquiring a historical duration of operation of the air conditioner in the operating mode;
   a judgment module, used for judging whether the historical duration is greater than a first set duration or not; and
   a setting module, used for setting a current operating temperature of the air conditioner based on a set operating temperature and an optimal reference temperature of the air conditioner at a first specified historical moment when the historical duration is greater than the first set duration;
   wherein, the optimal reference temperature is associated with each set operating temperature of the air conditioner, a duration of operation at each set operating temperature and power consumption in the first set duration before the current moment.

* * * * *